(12) United States Patent
Wimmer et al.

(10) Patent No.: US 10,719,362 B2
(45) Date of Patent: Jul. 21, 2020

(54) MANAGING MULTIPLE ISOLATED EXECUTION CONTEXTS IN A SINGLE PROCESS

(71) Applicant: Oracle International Corporation, Redwood Shores, CA (US)

(72) Inventors: Christian Wimmer, Belmont, CA (US); Peter Hofer, Linz (AT); Vojin Jovanovic, Zurich (CH); Oleg A. Pliss, Santa Clara, CA (US)

(73) Assignee: Oracle International Corporation, Redwood Shores, CA (US)

( * ) Notice: Subject to any disclaimer, the term of this patent is extended or adjusted under 35 U.S.C. 154(b) by 113 days.

(21) Appl. No.: 16/156,711

(22) Filed: Oct. 10, 2018

(65) Prior Publication Data

US 2020/0117509 A1 Apr. 16, 2020

(51) Int. Cl.
  *G06F 9/46* (2006.01)
  *G06F 9/50* (2006.01)
  *G06F 9/48* (2006.01)

(52) U.S. Cl.
  CPC .......... *G06F 9/5016* (2013.01); *G06F 9/4843* (2013.01); *G06F 9/5066* (2013.01)

(58) Field of Classification Search
  CPC ..... G06F 9/4843; G06F 9/5016; G06F 9/5066
  USPC ................................................ 718/102, 104
  See application file for complete search history.

(56) References Cited

U.S. PATENT DOCUMENTS

| 6,658,652 | B1 * | 12/2003 | Alexander, III | ...... | G06F 9/5016 707/999.202 |
| 6,848,106 | B1 * | 1/2005 | Hipp | ..................... | G06F 9/4843 709/213 |
| 7,103,625 | B1 * | 9/2006 | Hipp | ..................... | G06F 9/4843 709/201 |
| 7,210,147 | B1 * | 4/2007 | Hipp | ................... | H04L 12/4641 718/1 |

(Continued)

OTHER PUBLICATIONS

Stancu, Liviu Codrut, "Safe and Efficient Hybrid Memory Management for Java"; UC Irvine Electronic Theses and Dissertations: <https://escholarship.org/uc/item/2kv6w8m4>; Published Jan. 1, 2015 (107 pages).

(Continued)

*Primary Examiner* — Ted T. Vo
(74) *Attorney, Agent, or Firm* — Ferguson Braswell Fraser Kubasta PC

(57) ABSTRACT

A method may include generating, for a host application, an image including an image heap including objects and a writeable object partition including a subset of the objects. The method may further include initializing, by executing the image in a process of a computer system, a first isolate including a first address space and a first read-only map of the image heap. The first read-only map may designate the writeable object partition of the image heap as copy-on-write. The method may further include initializing, by executing the image in the process, a second isolate including a second address space and a second read-only map of the image heap. The method may further include performing, in the first isolate and using the first read-only map, a first task that accesses an object, and performing, in the second isolate and using the second read-only map, a second task that accesses the object.

20 Claims, 6 Drawing Sheets

(56) References Cited

U.S. PATENT DOCUMENTS

| | | | |
|---|---|---|---|
| 7,870,153 B2 * | 1/2011 | Croft | G06F 3/1415 |
| | | | 707/781 |
| 9,628,279 B2 * | 4/2017 | Probert | G06F 9/45558 |
| 10,241,819 B2 * | 3/2019 | Chen | G06F 12/109 |
| 10,331,462 B1 * | 6/2019 | Varda | G06F 9/4484 |

OTHER PUBLICATIONS

Guo, Yang, Custom startup snapshots: <https://v8.dev/blog/custom-startup-snapshots>; Published Sep. 25, 2015 (2 pages).

Schuster, Werner, The Essence of Google Dart: Building Applications, Snapshots, Isolates: <https://infoq.com/articles.google-dart/>; Oct. 24, 2011 (14 pages).

Kawachiya, Kiyokuni et al., "Cloneable JVM: A New Approach to Start Isolated Java Applications Faster"; VEE'07, Conference: Proceedings of the 3rd International Conference on Virtual Execution Environments; San Deigo, California, USA; Jun. 13-15, 2007 (11 pages).

\* cited by examiner

MANAGING MULTIPLE ISOLATED EXECUTION CONTEXTS IN A SINGLE PROCESS

BACKGROUND

A virtual machine (VM) has advantages in convenience, safety, security, and portability. However, initializing and loading an application in a VM typically incurs a significant cost, which multiplies when the application and its VM are launched multiple times. Isolating independent tasks in separate operating system processes avoids negative impacts on performance, safety, and security between the tasks. However, spawning separate processes incurs significant initialization costs and increased memory usage, especially for an application running on a VM.

Threads, which are also referred to as light-weight processes, are an approach to reduce initialization costs and memory usage by sharing the execution context of a host process. However, using threads provides little isolation, and therefore provides few benefits in safety and security. Moreover, the resources of a finished task belong to the host process and must be reclaimed individually.

Another approach is to initialize a pool of processes, and to assign each task to a process in the pool. Using a process pool provides a level of isolation similar to spawning tasks on demand, but allows earlier tasks to negatively affect later tasks, for example, when a process incurs a resource leak. Moreover, multiple processes incur increased memory usage, and generally require the reclamation of individual resources.

Multi-tenant extensions to programming languages (e.g., Java) allow a class loaded once by the VM to be used by multiple independent tenants by replicating the mutable static state (and only the static state, not immutable parts, like the code). However, every tenant still performs the same static class initialization steps.

A more radical approach for applications with strict goals of both isolation and low initialization costs is to avoid the use of a VM and instead rely on unmanaged languages without runtime systems that incur less setup cost for spawning processes. However, using unmanaged languages without runtime systems reduces maintainability, portability, safety, security and convenience.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method including generating, for a host application, an image including an image heap including objects and a writeable object partition including a subset of the objects. The method further includes initializing, by executing the image in a process of a computer system, a first isolate including a first address space and a first read-only map of the image heap. The first read-only map designates the writeable object partition of the image heap as copy-on-write. The method further includes initializing, by executing the image in the process, a second isolate including a second address space and a second read-only map of the image heap. The second read-only map designates the writeable object partition of the image heap as copy-on-write. The method further includes performing, in the first isolate and using the first read-only map, a first task that accesses an object, and performing, in the second isolate and using the second read-only map, a second task that accesses the object.

In general, in one aspect, one or more embodiments relate to a system including a memory coupled to a processor, a host application, and a process executing on the processor and using the memory including an image including an image heap including objects and a writeable object partition including a subset of the objects, and a first isolate including a first address space and a first read-only map of the image heap. The first read-only map designates the writeable object partition of the image heap as copy-on-write. The first isolate is configured to perform, using the first read-only map, a first task that accesses an object. The process further includes a second isolate including a second address space and a second read-only map of the image heap. The second read-only map designates the writeable object partition of the image heap as copy-on-write. The second isolate is configured to perform, using the second read-only map, a second task that accesses the object. The system further includes an image/isolate manager, executing on the processor and using the memory, configured to generate the image for the host application, and initialize, by executing the image in the process, the first isolate and the second isolate.

In general, in one aspect, one or more embodiments relate to a non-transitory computer readable medium including instructions that, when executed by a processor, perform: generating, for a host application, an image including an image heap including objects and a writeable object partition including a subset of the objects. The instructions further perform: initializing, by executing the image in a process of a computer system, a first isolate including a first address space and a first read-only map of the image heap. The first read-only map designates the writeable object partition of the image heap as copy-on-write. The instructions further perform: initializing, by executing the image in the process, a second isolate including a second address space and a second read-only map of the image heap. The second read-only map designates the writeable object partition of the image heap as copy-on-write. The instructions further perform: performing, in the first isolate and using the first read-only map, a first task that accesses an object, and performing, in the second isolate and using the second read-only map, a second task that accesses the object.

Other aspects of the invention will be apparent from the following description and the appended claims.

DETAILED DESCRIPTION

Figure 1:
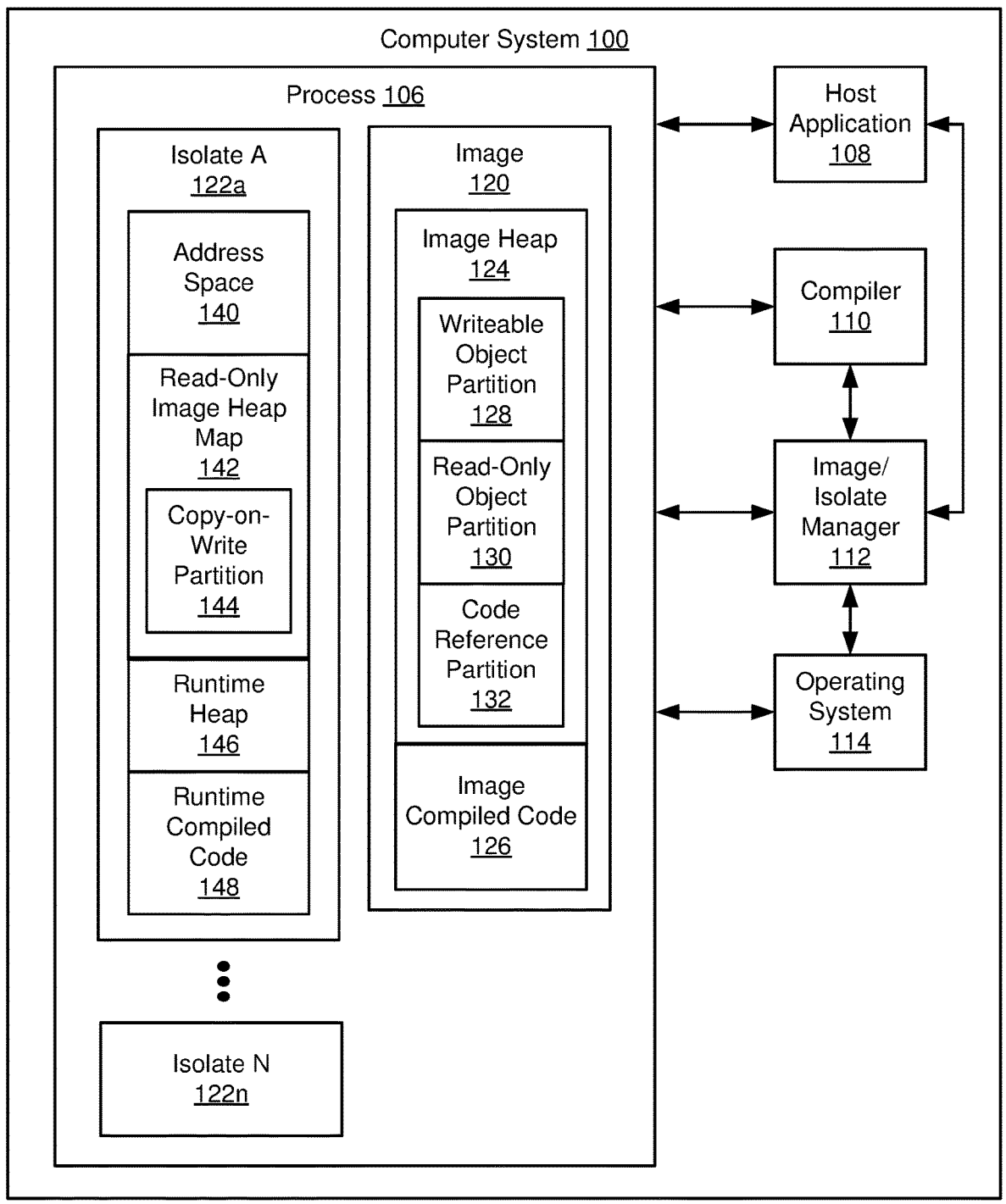
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed to a method, system, and computer-readable medium for managing multiple isolates in a single process. In one or more embodiments, isolates are distinct runtime execution contexts for a host application that executes in a virtual machine. An image may be prepared to initialize the host application. Loading the image into the process reduces the runtime initialization overhead for subsequently launched isolates. In one or more embodiments, the image includes an image heap that represents the initialized state of the host application and the virtual machine. Each isolate may have its own private address space with a private map of the image heap that includes a copy-on-write partition for modified objects. Thus, the initialized image heap may be shared among all isolates, except for modifications to writeable objects, which are private to the modifying isolate. References to objects in the image heap are encoded as offsets relative to a base address of each isolate's map of the image heap, and thus object references do not require adjustment for each isolate.

FIG. 1 shows a computer system (100) in accordance with one or more embodiments of the invention. In one or more embodiments, the computer system (100) takes the form of the computing system (500) described with respect to FIG. 5A and the accompanying description below, or takes the form of the client device (526) described with respect to FIG. 5B.

In one or more embodiments, the computer system (100) includes a process (106), a host application (108), a compiler (110), an image/isolate manager (112), and an operating system (114). In one or more embodiments, the host application (108) is a collection of source code including various software components. The host application (108) may include a collection of computer instructions written in a programming language, or intermediate representation (e.g., byte code). In one or more embodiments, the collection of computer instructions may construct and/or reference various objects. The host application (108) may include one or more entry points where the host application (108) may be invoked by software external to the host application (108). Examples of entry points include any function, procedure, or method exposed via an application programming interface (API).

In one or more embodiments, the compiler (110) transforms a program (e.g., the host application (108) or a portion thereof) (110) into machine code. For example, the compiler may include functionality to create machine code that, when executed in lieu of direct execution of an intermediate representation, improves the execution speed of the program. In one or more embodiments of the invention, the compiler includes functionality to perform dynamic compilation of operations or functions as the program is executing (e.g., just-in-time (JIT) compilation).

In one or more embodiments, the process (106) is a language virtual machine. A language virtual machine may provide a platform-independent programming environment that abstracts away details of the underlying computer system (100) or operating system (114). For example, the language virtual machine may allow the host application (108) to execute in the same way on any computing platform. In one or more embodiments, the process (106) includes an image (120) and isolates (122a, 122n). The image (120) and the isolates (122a, 122n) may be stored in a memory of the computer system (100). For example, the memory may be associated with persistent storage (506) and/or non-persistent storage (504) of the computing system (500) of FIG. 5A.

The image (120) may be an executable file that represents the result of initializing the host application (108). The image (120) may be accessed by the various isolates (122a, 122n), thus reducing the initialization overhead for the isolates (122a, 122n) to execute the host application (108). In one or more embodiments, the image (120) is specific to the operating system (114) and/or may be represented in a format specific to the computer system (100).

In one or more embodiments, the image (120) includes an image heap (124) and image compiled code (126). The image heap (124) may be an area of memory used for memory allocation, such that blocks of memory may be allocated and freed in an arbitrary order. For example, the image heap (124) may store objects and arrays dynamically allocated by the host application (108).

In one or more embodiments, the image heap (124) includes objects that are grouped into partitions. The image heap (124) may include a writeable object partition (128), a read-only object partition (130), a code reference partition (132), and other partitions. The writeable object partition (128) may include objects that may be modified by isolates (122a, 122n). For example, the writeable object partition (128) may include objects that represent local states or settings that may be modified by each isolate (122a, 122n). In contrast, the read-only object partition (130) may include objects that may be read, but not modified by isolates (122a, 122n). The code reference partition (132) may include objects that include references to functions, procedures, methods, etc. For example, the code reference partition (132) may include virtual method tables (vtables) that include references to an object's dynamically bound methods.

In one or more embodiments, image compiled code (126) includes code compiled from the host application (108) by a compiler (110).

Continuing with FIG. 1, in one or more embodiments, isolates (122a, 122n) are distinct runtime execution contexts for the host application (108). In one or more embodiments, each isolate (122a, 122n) may include functionality to perform its own heap management, garbage collection, and various other runtime services. In one or more embodiments, the execution contexts are isolated based on an isolation criterion. For example, the isolation criterion may be based on identity, where each isolate (122a, 122n) may correspond to a different user of the host application (108). Alternatively, the isolation criterion may be based on a type of task. For example, one isolate may correspond to creating and/or modifying data in the host application (108), while another isolate may correspond to analyzing data in the host application (108).

In one or more embodiments, each isolate (122a, 122n) includes one or more threads. For example, a thread may be the basic unit to which the operating system (114) allocates processor time. A thread may execute any part of the program being executed, including parts executed by another thread.

In one or more embodiments, each isolate (122a, 122n) includes an address space (140), a read-only image heap map (142), a runtime heap (146), and runtime compiled code (148). Each thread of an isolate (122a) may access the address space (140), read-only image heap map (142), runtime heap (146), and runtime compiled code (148) of the isolate (122a). Each thread may have its own private stack that is inaccessible to other threads.

In one or more embodiments, the address space (140) includes a range of contiguous locations in the memory of the computer system (100). In one or more embodiments, the read-only image heap map (142), runtime heap (146), and runtime compiled code (148) are stored in the address space (140). The read-only image heap map (142) may be stored at the starting address, called the base address, of the address space (140). In one or more embodiments, the read-only image heap map (142) maps object references to offsets. For example, each offset may be interpreted as a relative address that is added to the base address to obtain an absolute address of an object in the address space (140). In one or more embodiments, the read-only image heap map (142) includes the locations of the various partitions of the image heap (124), including the writeable object partition (128), the read-only object partition (130), the code reference partition (132), and other partitions.

In one or more embodiments, a reference to an object is a compressed reference that includes a number of bits that is smaller than a word size of the computer system (100). For example, the compressed reference may be 32 bits, and the word size of the computer system (100) may be 64 bits.

In one or more embodiments, the read-only image heap map (142) includes a copy-on-write partition (144). The copy-on-write partition (144) may include references to objects in the writeable object partition (128) of the image heap (124). In one or more embodiments, when an object in the copy-on-write partition (144) is modified, a local copy of the memory page in non-persistent storage that includes the modified object is generated by the operating system (114) for the isolate (122a) performing the modification, without modifying the image heap (124) in persistent storage. In other words, the modification may only be accessible by the isolate (122a) performing the modification.

In one or more embodiments, the operating system (114) may be implemented in hardware (e.g., circuitry), software, firmware, and/or any combination thereof. In one or more embodiments, the operating system (114) includes functionality to create a process (106). In one or more embodiments, the operating system (114) includes functionality to load data, into non-persistent storage, from the image (120) stored in persistent storage. The operating system (114) may include functionality to create and/or update a page map that maps pages in non-persistent storage to pages in persistent storage. The operating system (114) may include functionality to use the page map to load data (e.g., pages) from persistent storage to non-persistent storage as needed. The operating system (114) may include functionality to, when a mapped page is modified, perform the modification(s) on a local copy of the modified page in non-persistent storage, without modifying the corresponding page in persistent storage. In one or more embodiments, the operating system (114) may include functionality to generate memory mappings when the image (120) is loaded into non-persistent storage. For example, the memory mappings may indicate the locations in persistent storage corresponding to the partitions and/or objects of the image heap (124) in non-persistent storage.

In one or more embodiments, the runtime heap (146) is an area of memory used for memory allocation at runtime, for example, during execution of an isolate (122a). The runtime heap (146) may include objects that are private with respect to a specific isolate, and are thus inaccessible by other isolates. In one or more embodiments, runtime compiled code (148) includes code compiled at runtime, for example, during execution of an isolate (122a). The runtime compiled code (148) may be private with respect to a specific isolate, and thus inaccessible by other isolates.

In one or more embodiments, the image/isolate manager (112) may be implemented in hardware, software, firmware, and/or any combination thereof. In one or more embodiments, the image/isolate manager (112) includes functionality to generate the image (120) for the host application (108). The image/isolate manager (112) may include functionality to initialize, using the image (120), one or more isolates (122a, 122n) in a process (106). The image/isolate manager (112) may include functionality to adjust, in the read-only image heap map (142), code references (e.g., code references in objects in the code reference partition (132)).

While FIG. 1 shows a configuration of components, other configurations may be used without departing from the scope of the invention. For example, various components may be combined to create a single component. As another example, the functionality performed by a single component may be performed by two or more components.

Figure 2:
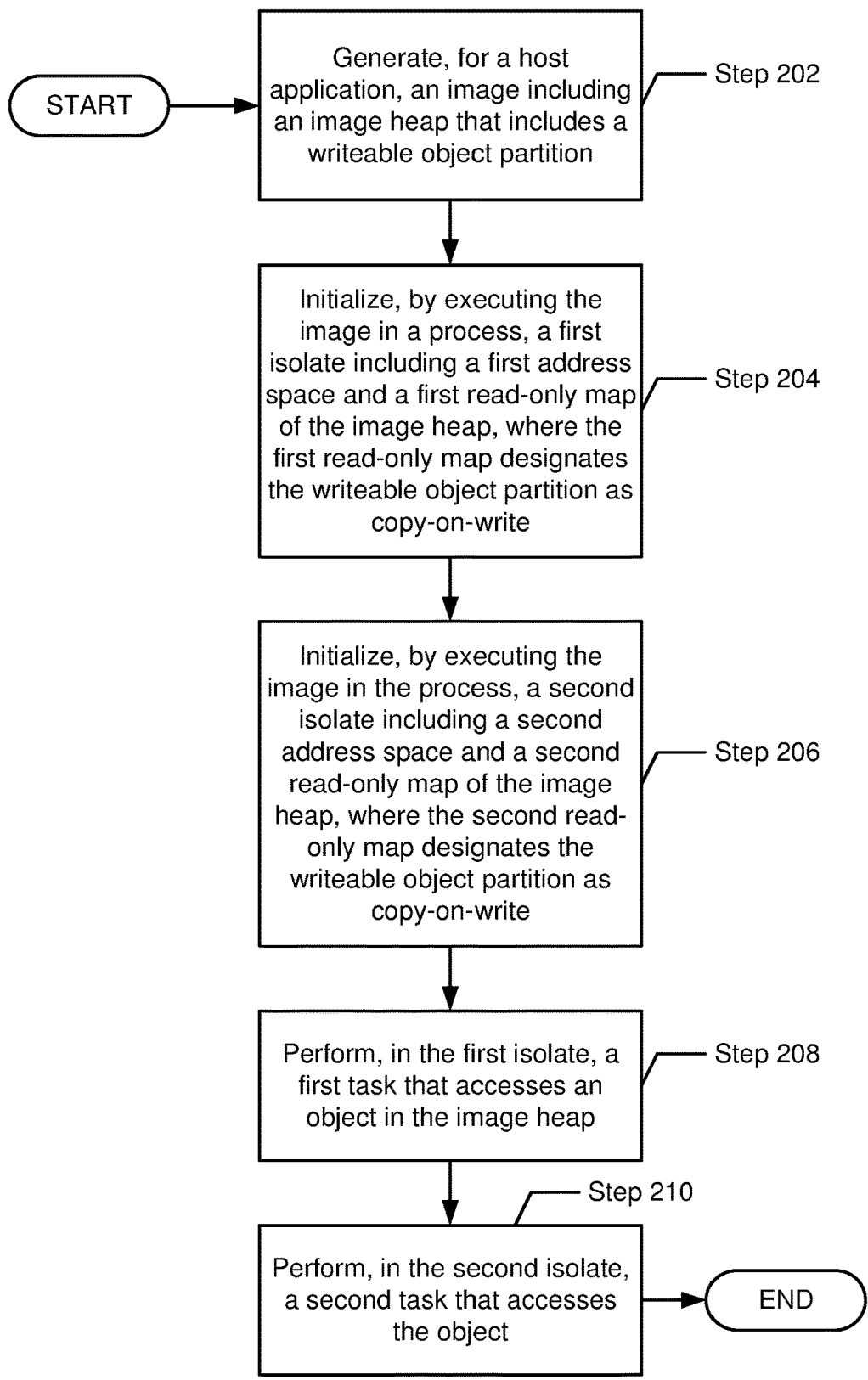
FIG. 2 and FIG. 3 show flowcharts in accordance with one or more embodiments of the invention.

FIG. 2 shows a flowchart in accordance with one or more embodiments of the invention. The flowchart depicts a process for managing multiple isolates in a single process. One or more of the steps in FIG. 2 may be performed by the components (e.g., the image/isolate manager (112) of the computer system (100)), discussed above in reference to FIG. 1. In one or more embodiments of the invention, one or more of the steps shown in FIG. 2 may be omitted, repeated, and/or performed in parallel, or in a different order than the order shown in FIG. 2. Accordingly, the scope of the invention should not be considered limited to the specific arrangement of steps shown in FIG. 2.

Initially, in Step 202, an image including an image heap is generated for a host application. The host application may execute in a virtual machine. In one or more embodiments, the image/isolate manager identifies dependencies of the host application. For example, the dependencies may include code required to execute the host application, such as imported functions, procedures, data structures, modules, etc. The image/isolate manager may perform a static analysis of the host application and its dependencies to determine reachable objects and reachable code (e.g., functions, methods, procedures, etc.). The static analysis may be performed relative to one or more entry points of the host application. The reachable objects may be determined by traversing an object graph starting with objects that are referenced from static fields. The reachable objects may include classes, methods, functions, fields, etc. that may be accessed during execution of the host application. In one or more embodiments, the reachable functions are compiled to optimized machine code for fast execution at runtime (e.g., by an isolate).

In one or more embodiments, initialization tasks are performed during the static analysis. For example, one initialization task may be executing static class initializers. In one or more embodiments, the image heap is allocated by serializing the reachable objects. In the serialized representation of an object, references to other objects may be encoded as offsets relative to the start of the image heap.

In one or more embodiments, the image/isolate manager may group the objects of the image heap into partitions, including a writeable object partition, read-only object partition, and a code reference partition. For example, the image/isolate manager may assign an object to the writeable object partition if the static analysis determines that the object may be modified. Alternatively, the image/isolate manager may assign an object to the read-only object partition if the static analysis determines that the object is never modified.

In one or more embodiments, the image/isolate manager adjusts any references from code (e.g., functions, methods, procedures, etc.) to objects by encoding the references as offsets from a start address of the image heap.

In one or more embodiments, references to object are represented as compressed references. Using compressed references is an optimization that reduces the size of objects, especially object reference arrays. In addition, the image may be substantially smaller. The compressed reference optimization is feasible since the referenced objects are in a contiguous address space. Furthermore, execution speed may be increased due to improved cache behavior. In one or more embodiments, a compressed reference is encoded by shifting the bits of the compressed reference by a predetermined number of bits. Bit-shifting is an optimization that increases the effective number of bits in the reference, and thus increases the effective size of the address space. In one or more embodiments, the predetermined number of bits is based on an object allocation boundary of the computer system. For example, if objects are allocated on 8-byte boundaries, then the bits of the reference may be shifted by 3 bits (e.g., since the lower 3 bits of each reference are zero when objects are allocated on 8-byte boundaries).

In one or more embodiments, the generated image includes the image heap and the compiled functions.

In Step 204, a first isolate is initialized including a first address space and a first read-only map of the image heap. In one or more embodiments, the isolate may be generated in response to a request. For example, the isolate may correspond to a request from a user to execute the host application.

In one or more embodiments, the image/isolate manager generates the first isolate by executing the image in a process of the computer system. The image/isolate manager may generate the first address space by reserving a contiguous memory range from the operating system in non-persistent storage large enough to include the image heap, a runtime heap (e.g., at a provisioned size), and code compiled at runtime.

In one or more embodiments, the image/isolate manager identifies the location of the image heap in the image stored in persistent storage. In one or more embodiments, the location of the image heap in persistent storage may be identified using memory mappings created by a loader of the operating system when loading the image heap into non-persistent storage. The image/isolate manager may cache the identified location of the image heap so that it will be unnecessary to again identify the location of the image heap when initializing subsequent isolates (e.g., when initializing the second isolate in Step 206 below).

Once the location of the image heap in persistent storage is identified, the image/isolate manager may generate the first read-only image heap map using the memory mappings created by the loader. The first read-only image heap map may be stored at the base address of the first address space. The first read-only image heap map may designate the writeable object partition of the image heap as copy-on-write.

In Step 206, a second isolate is initialized including a second address space and a second read-only map of the image heap (see description of Step 204 above). The image/isolate manager may generate the second isolate by executing the image in the process. The second address space may be generated by reserving a contiguous memory range from the operating system large enough to include the image heap, a runtime heap, and code compiled at runtime.

Using the cached location of the image heap in persistent storage from Step 204 above, the image/isolate manager may generate the second read-only image heap map. The second read-only image heap map may be stored at the base address of the second address space. The second read-only image heap map may designate the writeable object partition of the image heap as copy-on-write.

In Step 208, a first task that accesses an object in the image heap is performed in the first isolate. The object may be accessed using the first read-only image heap map. In one or more embodiments, prior to accessing the object, the reference to the object is decoded by adding the first base address to the reference to obtain the absolute address of the object in the first address space (e.g., since the reference to the object had been encoded as an offset relative to the start of the image heap in Step 202 above).

In one or more embodiments, the first task stores the reference to the object in another object. Prior to storing the reference, the reference may be encoded by subtracting the first base address from the reference to obtain the offset of the object relative to the start of the image heap.

The first task may be any task performed by the host application, or an application invoked by the host application. For example, the first task may read and/or modify one or more objects in the image heap and/or the runtime heap of the first isolate.

In one or more embodiments, additional memory may be allocated in the first address space for newly allocated objects and/or code compiled at runtime. The additional memory may be allocated in response to a request (e.g., from the first isolate or the image/isolate manager) for physical memory from the operating system.

After performing the first task, the first isolate may perform zero or more additional tasks, after which the first isolate may be terminated. In one or more embodiments, the first isolate is terminated by first interrupting each thread of the first isolate. For example, the interrupt may trigger an exception that can be handled by the thread and passed on for a clean shutdown. Once all threads of the first isolate have terminated, the first isolate may be terminated by returning the entire memory region allocated in the first address space to the operating system.

In Step 210, a second task that accesses the object is performed in the second isolate (see description of Step 208 above). The object may be accessed using the second read-only image heap map.

Figure 3:
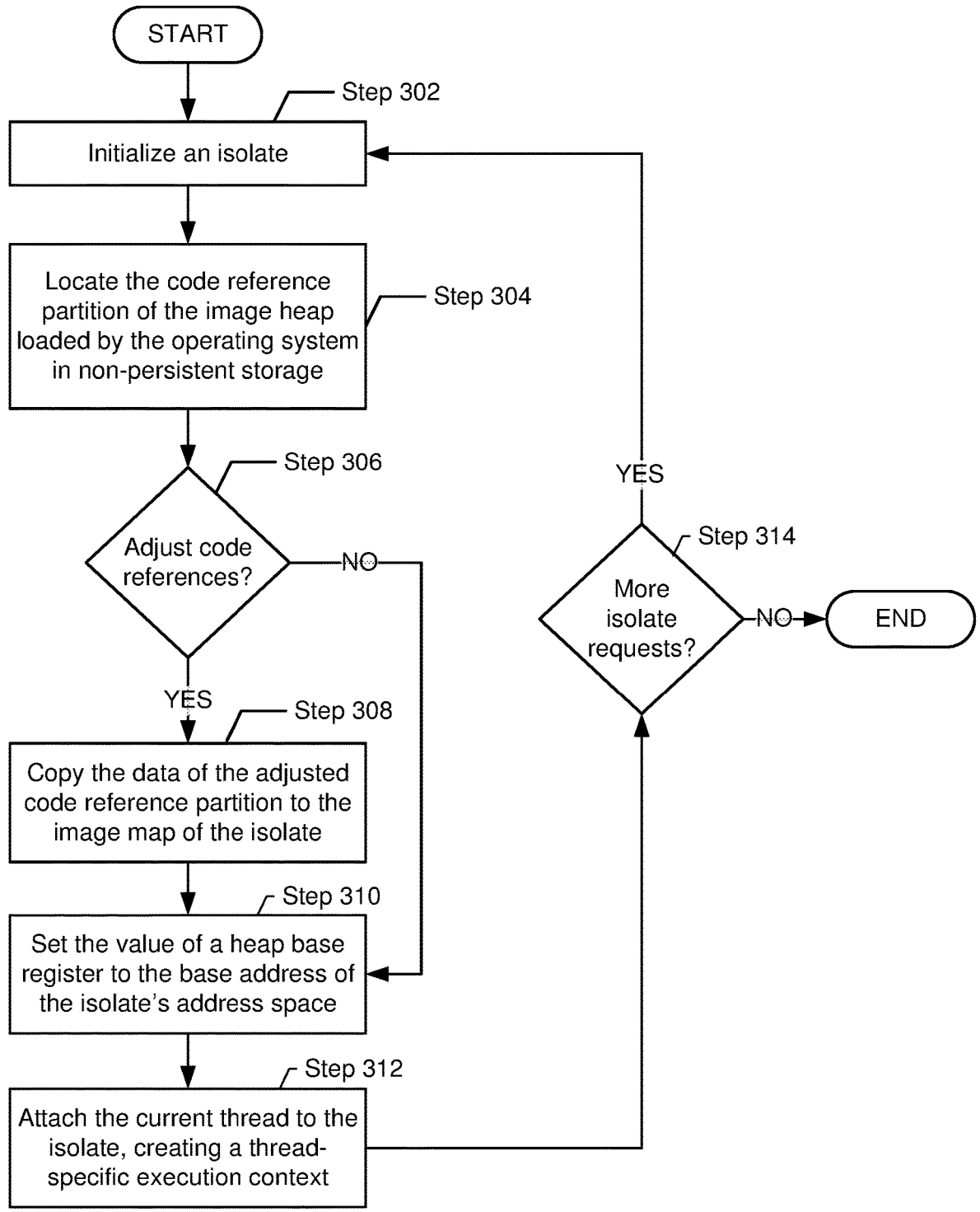

FIG. 3 shows a flowchart in accordance with one or more embodiments of the invention. The flowchart depicts a process for managing multiple isolates in a single process. One or more of the steps in FIG. 3 may be performed by the components (e.g., the image/isolate manager (112) of the computer system (100)), discussed above in reference to FIG. 1. In one or more embodiments of the invention, one or more of the steps shown in FIG. 3 may be omitted, repeated, and/or performed in parallel, or in a different order than the order shown in FIG. 3. Accordingly, the scope of the invention should not be considered limited to the specific arrangement of steps shown in FIG. 3.

Initially, in Step 302, an isolate is initialized (see description of Step 204 above).

In Step 304, the code reference partition of the image heap loaded by the operating system is located in non-persistent storage. The location of the code reference partition loaded by the operating system may be identified using the memory mappings created by the loader of the operating system when loading the image heap into non-persistent storage (see description of Step 204 above). The loader may have adjusted one or more code references that referred to compiled code of the image. In one or more embodiments, the code references to the compiled code of the image are absolute addresses which depend on the address where the image will be loaded into memory. For example, if the image is built as an executable file, a static linker of the operating system may assign a fixed base address at which the image will be loaded. Thus, the static linker may be able to compute the final absolute addresses for the code references ahead of time, and write the absolute addresses to the code reference partition in the image file in persistent storage. Thus, when a new isolate is created in Step 302 above, the code reference partition that is mapped from persistent storage may already contain the final, absolute addresses, and the code references do not require adjustment.

In contrast, if the image is built as a shared library file, then no base address may be assigned ahead of time. Instead, a dynamic loader/linker of the operating system may load the image file at an arbitrary base address, and adjust the code references in the code reference partition in non-persistent storage accordingly. However, when creating a new isolate, the code reference partition may be mapped from the image file in persistent storage, which does not contain the correct, adjusted absolute addresses for the code references. Thus, the adjusted code reference values (absolute addresses) may be copied from the code reference partition in non-persistent storage, where the code references were initially adjusted by the dynamic loader/linker (see description of Step 308 below).

The location of the code reference partition loaded into non-persistent storage by the operating system may be cached for use in subsequent iterations of the process described in FIG. 3, when processing subsequently generated isolates.

If, in Step 306, it is determined that one or more references in the code reference partition require adjustment, then Step 308 below is executed. In one or more embodiments, a reference requires adjustment when the value of the reference in the code reference partition loaded by the operating system is different from the value of the code reference obtained via the read-only image heap map of the isolate. Otherwise, if Step 306 determines that no references in the code reference partition require adjustment, then Step 310 below is executed.

In Step 308, the data from the code reference partition loaded by the operating system is copied to the code reference partition of the read-only image heap map of the isolate. Thus, the read-only image heap map now has the code references that were adjusted by the operating system. In one or more embodiments, the entire code reference partition loaded by the operating system is copied to the code reference partition of the read-only image heap map of the isolate.

In Step 310, the value of a heap base register is set to the base address of the address space of the isolate. In one or more embodiments, the heap base register is used to improve the efficiency of encoding and decoding references to objects. For example, decoding a reference to an object may involve adding the base address to the reference, and encoding a reference to an object may involve subtracting the base address from the reference.

In Step 312, the current thread is attached to the isolate, creating a thread-specific execution context. In one or more embodiments, the current thread is added to a list of threads associated with the isolate. For example, the list of threads may be used to identify which threads to terminate when the isolate is terminated (see description of Step 208 above).

In Step 314, if it is determined that there are additional requests to initialize an isolate, then Step 302 is again executed to initialize additional isolates.

Figure 4A:
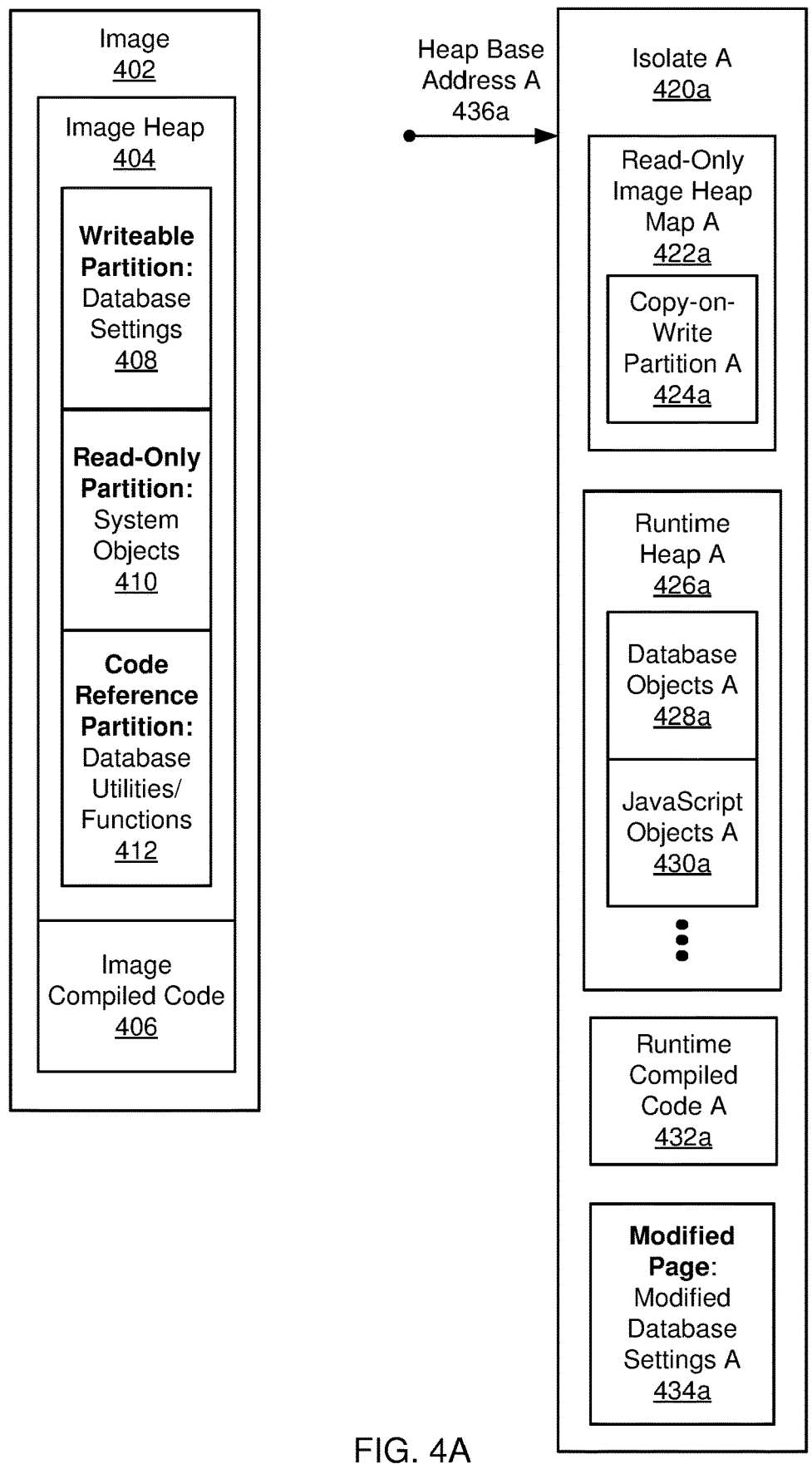
FIG. 4A and FIG. 4B show examples in accordance with one or more embodiments of the invention.
Figure 4B:
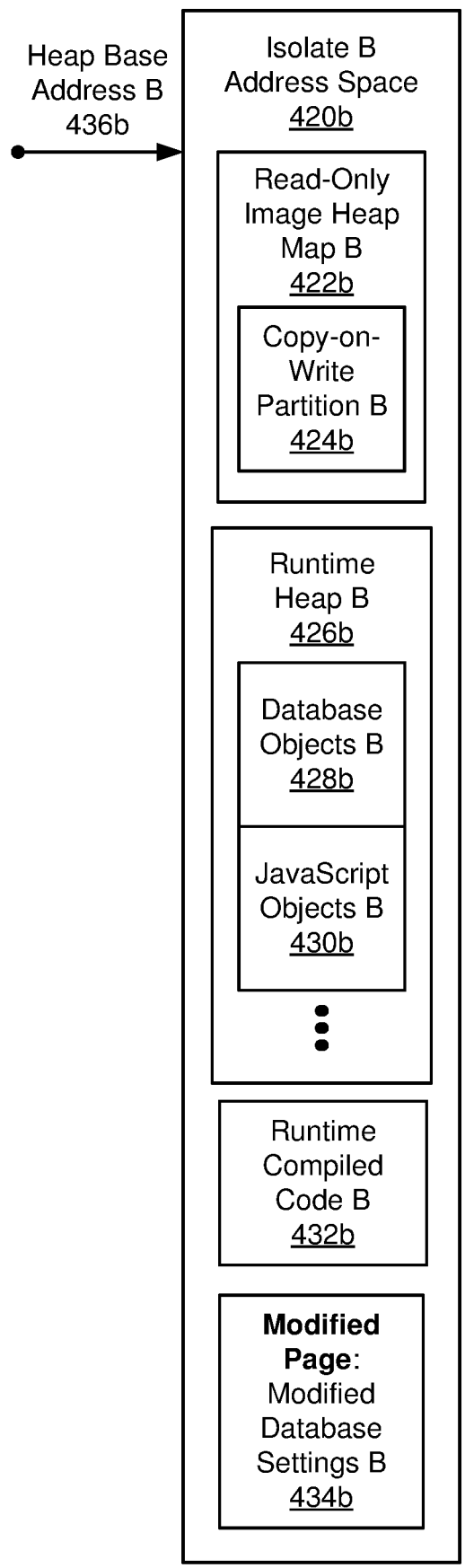

The following example is for explanatory purposes only and not intended to limit the scope of the invention. FIG. 4A and FIG. 4B show an implementation example in accordance with one or more embodiments of the invention. FIG. 4A shows an image (402) ((120) in FIG. 1) and an isolate (420*a*) (e.g., (122*a*) in FIG. 1). The image/isolate manager ((112) in FIG. 1) generates the image (402) for a host application ((108) in FIG. 1), a database engine that executes in the Java Virtual Machine.

The image (402) includes an image heap (404) and image compiled code (406). The image/isolate manager generates the image heap (404) using a static analysis of the database engine and its dependencies. The dependencies include JavaScript code that may be invoked inside the database engine. The static analysis identifies reachable objects by traversing an object graph starting with objects referenced from static fields of the database engine. The image/isolate manager allocates the reachable objects in the image heap (404) by serializing the reachable objects. The image/isolate manager encodes each reference to an object as an offset relative to the start of the image heap (404). A compiler ((110) in FIG. 1) compiles reachable code identified by the static analysis to the image compiled code (406) for fast execution at runtime (e.g., by isolate A (420*a*)).

The image/isolate manager groups the objects of the image heap (404) into partitions, including a writeable partition (408), read-only partition (410), and a code reference partition (412). The writeable partition (408) includes user-modifiable database settings that control the runtime behavior of database engine sessions (e.g., display and formatting settings). The read-only partition (410) includes system objects that should not be modified by users (e.g., objects used for system administration, objects that control the behavior of the database engine for all users, etc.). The code reference partition (412) includes various database functions and utilities (e.g., invoked by commands in SQL or JavaScript code). The image/isolate manager also adjusts any references from code (e.g., functions, methods, procedures, etc.) to objects by encoding the references as offsets from the start address of the image heap (404).

Next, the operating system ((114) in FIG. 1) creates a process ((106) in FIG. 1) and loads the image (402) into non-persistent storage. The loaded image (402) will be used to streamline the initialization of the database engine in various isolates, such as isolate A (420*a*). The operating system creates a mapping of locations in persistent storage corresponding to the partitions (408, 410, 412) and objects of the image heap (404) loaded in non-persistent storage.

The image/isolate manager then initializes isolate A (420*a*) in response to receiving a request from user A to execute the database engine. The image/isolate manager generates an address space for isolate A (420*a*) by reserving a contiguous memory range from the operating system. Using the mapping created by the operating system, the image/isolate manager generates read-only image heap map A (422*a*). The image/isolate manager stores read-only image heap map A (422*a*) at the starting address of the address space of isolate A (420*a*). The starting address is also referred to as heap base address A (436*a*). Read-only image heap map A (422*a*) includes copy-on-write partition A (424*a*), which includes objects in the writeable object partition (408) of the image heap (404).

After isolate A (420*a*) has been initialized, isolate A (420*a*) performs various tasks as the database engine is executed. The tasks performed by isolate A (420*a*) are responsive to input from user A, such as database queries and functions invoked during the execution of the queries. The tasks access objects using read-only image heap map A (422*a*). Prior to accessing an object, a reference to the object is decoded by adding heap base address A (436*a*) to the reference to obtain the absolute address of the object in the address space for isolate A (420*a*). To improve the efficiency of accessing objects, heap base address A (436*a*) is stored in a heap base register.

Performing the tasks results in allocating database objects A (428*a*) and JavaScript objects A (430*a*) in runtime heap A (426*a*) of isolate A (420*a*). A compiler generates runtime compiled code A (432*a*) from additional JavaScript code provided by (e.g., written by) user A. Runtime heap A (426*a*) and runtime compiled code A (432*a*) are accessible to isolate A (420*a*) but are inaccessible to other isolates, such as isolate B (420*b*) of FIG. 4B. The address space for isolate A (420*a*) reserved from the operating system is sufficiently large to include both runtime heap A (426*a*) and runtime compiled code A (428*a*).

One of the tasks modifies the database settings in the writeable partition (408) of the image heap (404). Since read-only image heap map A (422*a*) indicates that objects in the writeable partition (408) of the image heap (404) are in copy-on-write partition A (424*a*), the modified database settings are stored in modified page A (434*a*) that is private to isolate A (420*a*), and inaccessible to other isolates.

As illustrated in FIG. 4B, the image/isolate manager then initializes isolate B (420*b*) in response to receiving a request from user B to execute the database engine. The image/isolate manager generates an address space for isolate B (420*b*) by reserving a contiguous memory range from the operating system. Using the mapping created (e.g., cached) by the operating system, the image/isolate manager generates read-only image heap map B (422*b*). The image/isolate manager stores read-only image heap map B (422*b*) at the starting address of the address space of isolate B (420*b*). The starting address is also referred to as heap base address B (436*b*). Read-only image heap map B (422*b*) includes copy-on-write partition B (424*b*), which refers to objects in the writeable object partition (408) of the image heap (404). After isolate B (420*b*) has been initialized, isolate B (420*b*) performs various tasks as the database engine is executed. The tasks performed by isolate B (420*b*) are responsive to input from user B. The tasks access objects using read-only image heap map B (422*b*). Prior to accessing an object, a reference to the object is decoded by adding heap base address B (436*b*) to the reference to obtain the absolute address of the object in the address space for isolate B (420*b*). To improve the efficiency of accessing objects, heap base address B (436*b*) is stored in the heap base register.

Performing the tasks results in allocating database objects B (428*b*) and JavaScript objects B (430*b*) in runtime heap B (426*b*) of isolate B (420*b*). A compiler generates runtime compiled code B (432*b*) from additional JavaScript code provided by user B. Runtime heap B (426*b*) and runtime compiled code B (432*b*) are accessible to isolate B (420*b*) and inaccessible to other isolates, such as isolate A (420*a*) of FIG. 4A.

One of the tasks modifies the database settings in the writeable partition (408) of the image heap (404). Since read-only image heap map B (422*b*) indicates that objects in the writeable partition (408) of the image heap (404) are in copy-on-write partition B (424*b*), the modified database settings are stored in modified page B (434*b*) that is private to isolate B (420*b*), and inaccessible to other isolates.

Figure 5A:
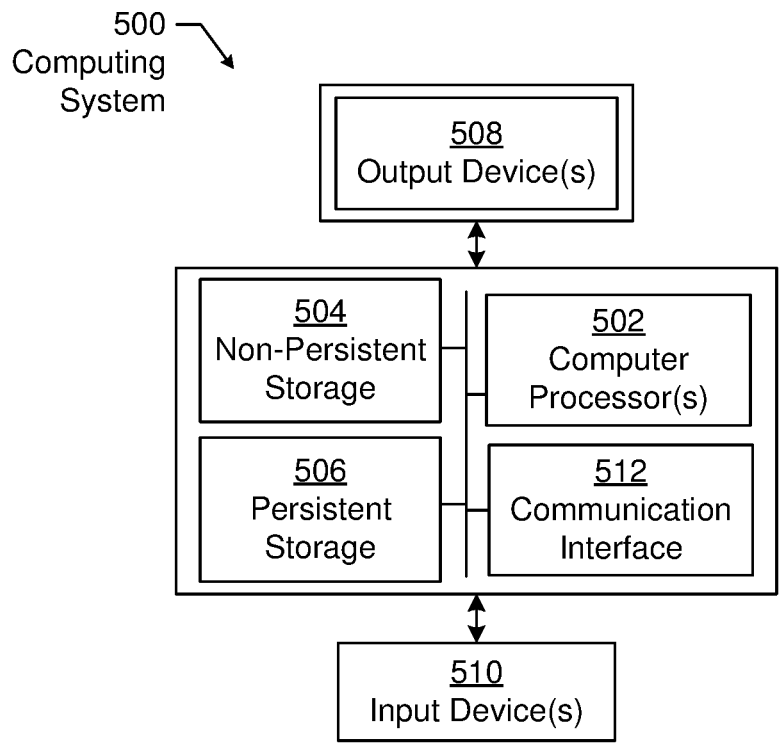
FIG. 5A and FIG. 5B show computing systems in accordance with one or more embodiments of the invention.

Embodiments disclosed herein may be implemented on a computing system. Any combination of mobile, desktop, server, router, switch, embedded device, or other types of hardware may be used. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments disclosed herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments disclosed herein.

Figure 5B:
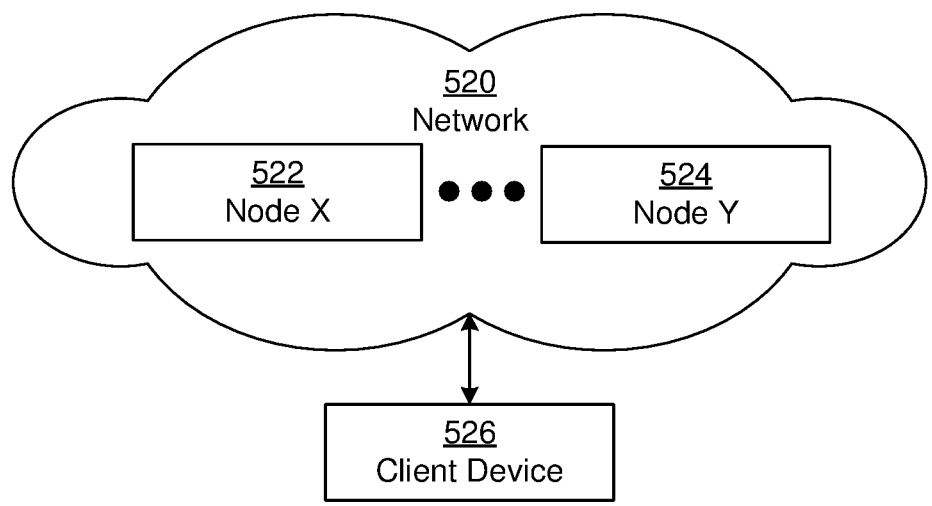

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments disclosed herein may be implemented on a node of a distributed system that is connected to other nodes. By way of another example, embodiments disclosed herein may be implemented on a distributed computing system having multiple nodes, where each portion disclosed herein may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments disclosed herein.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions presents only a few examples of functions performed by the computing system of FIG. 5A and the nodes and/or client device in FIG. 5B. Other functions may be performed using one or more embodiments disclosed herein.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method, comprising:
generating, for a host application, an image comprising an image heap comprising:
a plurality of objects, and
a writeable object partition comprising a first subset of the plurality of objects;
initializing, by executing the image in a process of a computer system, a first isolate comprising a first address space and a first read-only map of the image heap, wherein the first read-only map designates the writeable object partition of the image heap as copy-on-write;
initializing, by executing the image in the process, a second isolate comprising a second address space and a second read-only map of the image heap, wherein the second read-only map designates the writeable object partition of the image heap as copy-on-write;
performing, in the first isolate and using the first read-only map, a first task that accesses a first object of the plurality of objects; and
performing, in the second isolate and using the second read-only map, a second task that accesses the first object.

2. The method of claim 1, further comprising:
encoding, in the image heap, each reference to the first object as an offset relative to a start address of the image heap;
prior to accessing the reference in the first isolate, adding the offset to a first base address of the image heap in the first address space; and
prior to accessing the reference in the second isolate, adding the offset to a second base address of the image heap in the second address space.

3. The method of claim 2,
wherein the computer system comprises an image heap base register,
wherein generating the first isolate comprises setting the value of the image heap base register to the first base address,
wherein adding the offset to the first base address comprises adding the offset to the value of the image heap base register in the first isolate,
wherein generating the second isolate comprises setting the value of the image heap base register to the second base address, and
wherein adding the offset to the second base address comprises adding the offset to the value of the image heap base register in the second isolate.

4. The method of claim 2,
wherein the reference to the first object is a compressed reference comprising a number of bits that is smaller than a word size of the computer system, and
wherein encoding the reference comprises shifting the bits of the reference by a predetermined number of bits based on an object allocation boundary of the computer system.

5. The method of claim 1, wherein the image further comprises compiled code, and wherein generating the image comprises:
identifying, for the host application, reachable functions and reachable objects;
compiling the reachable functions into the compiled code; and
allocating the image heap by serializing the reachable objects.

6. The method of claim 1, further comprising:
modifying the first object in the first isolate,
wherein the first object is in the writeable object partition of the image heap, and
wherein the modification to the first object is inaccessible to the second isolate.

7. The method of claim 1,
wherein the image further comprises compiled code,
wherein the image heap further comprises a code reference partition comprising a plurality of code references to the compiled code, wherein each of the plurality of code references accesses a function, and
wherein generating the first isolate further comprises:
determining that a code reference of the plurality of code references requires adjustment; and
in response to determining that the code reference requires adjustment, adjusting the code reference.

8. The method of claim 7,
wherein determining that the code reference requires adjustment comprises:
obtaining, from the first read-only image heap map, a first value of the code reference from the code reference partition of the image heap;
locating, within a memory of the computer system, the code reference partition of the image heap loaded by an operating system of the computer system;
obtaining a second value of the code reference from the code reference partition loaded by the operating system; and
determining that the first value and the second value are different, and
wherein adjusting the code reference comprises setting the value of the code reference in the first read-only image heap map to the second value.

9. A system, comprising:
a memory coupled to a processor;
a host application;
a process executing on the processor and using the memory, comprising:
an image comprising an image heap comprising:
a plurality of objects, and
a writeable object partition comprising a first subset of the plurality of objects,
a first isolate comprising a first address space and a first read-only map of the image heap, wherein the first read-only map designates the writeable object partition of the image heap as copy-on-write, wherein the first isolate is configured to perform, using the first read-only map, a first task that accesses a first object of the plurality of objects, and
a second isolate comprising a second address space and a second read-only map of the image heap, wherein the second read-only map designates the writeable object partition of the image heap as copy-on-write, wherein the second isolate is configured to perform, using the second read-only map, a second task that accesses the first object; and an image/isolate manager, executing on the processor and using the memory, configured to:
  generate the image for the host application; and
  initialize, by executing the image in the process, the first isolate and the second isolate.

10. The system of claim 9, wherein the image/isolate manager is further configured to:
  encode, in the image heap, each reference to the first object as an offset relative to a start address of the image heap;
  prior to accessing the reference in the first isolate, add the offset to a first base address of the image heap in the first address space; and
  prior to accessing the reference in the second isolate, add the offset to a second base address of the image heap in the second address space.

11. The system of claim 10,
  wherein the processor comprises an image heap base register,
  wherein generating the first isolate comprises setting the value of the image heap base register to the first base address,
  wherein adding the offset to the first base address comprises adding the offset to the value of the image heap base register in the first isolate,
  wherein generating the second isolate comprises setting the value of the image heap base register to the second base address, and
  wherein adding the offset to the second base address comprises adding the offset to the value of the image heap base register in the second isolate.

12. The system of claim 10,
  wherein the reference to the first object is a compressed reference comprising a number of bits that is smaller than a word size of the system, and
  wherein encoding the reference comprises shifting the bits of the reference by a predetermined number of bits based on an object allocation boundary of the system.

13. The system of claim 9, further comprising a compiler executing on the processor and using the memory,
  wherein the image further comprises compiled code,
  wherein the image/isolate manager is further configured to:
    identify, for the host application, reachable functions and reachable objects; and
    allocate the image heap by serializing the reachable objects, and
  wherein the compiler is configured to compile the reachable functions into the compiled code.

14. The system of claim 9, wherein the image/isolate manager is further configured to:
  modify the first object in the first isolate,
  wherein the first object is in the writeable object partition of the image heap, and
  wherein the modification to the first object is inaccessible to the second isolate.

15. The system of claim 9,
  wherein the image further comprises compiled code,
  wherein the image heap further comprises a code reference partition comprising a plurality of code references to the compiled code, wherein each of the plurality of code references accesses a function, and
  wherein generating the first isolate further comprises:
    determining that a code reference of the plurality of code references requires adjustment; and
    in response to determining that the code reference requires adjustment, adjusting the code reference.

16. The system of claim 15, further comprising an operating system executing on the processor and using the memory,
  wherein the operating system is configured to load, into the memory, the code reference partition of the image heap,
  wherein determining that the code reference requires adjustment comprises:
    obtaining, from the first read-only image heap map, a first value of the code reference from the code reference partition of the image heap;
    locating, within the memory, the code reference partition of the image heap loaded by the operating system;
    obtaining a second value of the code reference from the code reference partition loaded by the operating system; and
    determining that the first value and the second value are different, and
  wherein adjusting the code reference comprises setting the value of the code reference in the first read-only image heap map to the second value.

17. A non-transitory computer readable medium comprising instructions that, when executed by a processor, perform:
  generating, for a host application, an image comprising an image heap comprising:
    a plurality of objects, and
    a writeable object partition comprising a first subset of the plurality of objects;
  initializing, by executing the image in a process of a computer system, a first isolate comprising a first address space and a first read-only map of the image heap, wherein the first read-only map designates the writeable object partition of the image heap as copy-on-write;
  initializing, by executing the image in the process, a second isolate comprising a second address space and a second read-only map of the image heap, wherein the second read-only map designates the writeable object partition of the image heap as copy-on-write;
  performing, in the first isolate and using the first read-only map, a first task that accesses a first object of the plurality of objects; and
  performing, in the second isolate and using the second read-only map, a second task that accesses the first object.

18. The non-transitory computer readable medium of claim 17, further comprising instructions that perform:
  encoding, in the image heap, each reference to the first object as an offset relative to a start address of the image heap;
  prior to accessing the reference in the first isolate, adding the offset to a first base address of the image heap in the first address space; and
  prior to accessing the reference in the second isolate, adding the offset to a second base address of the image heap in the second address space.

19. The non-transitory computer readable medium of claim 18,
  wherein the computer system comprises an image heap base register,
  wherein generating the first isolate comprises setting the value of the image heap base register to the first base address,
  wherein adding the offset to the first base address comprises adding the offset to the value of the image heap base register in the first isolate, wherein generating the second isolate comprises setting the value of the image heap base register to the second base address, and wherein adding the offset to the second base address comprises adding the offset to the value of the image heap base register in the second isolate.

20. The non-transitory computer readable medium of claim 18, wherein the reference to the first object is a compressed reference comprising a number of bits that is smaller than a word size of the computer system, and wherein encoding the reference comprises shifting the bits of the reference by a predetermined number of bits based on an object allocation boundary of the computer system.

* * * * *